US008888356B2

(12) United States Patent
Son et al.

(10) Patent No.: US 8,888,356 B2
(45) Date of Patent: Nov. 18, 2014

(54) BACKLIGHT ASSEMBLY AND DISPLAY APPARATUS HAVING THE SAME

(75) Inventors: Young-Ran Son, Gyeongsangnam-do (KR); Cheol-Yong Noh, Chungcheongnam-do (KR); Ju-Hwa Ha, Chungcheongnam-do (KR)

(73) Assignee: Samsung Display Co., Ltd. (KR)

( * ) Notice: Subject to any disclaimer, the term of this patent is extended or adjusted under 35 U.S.C. 154(b) by 190 days.

(21) Appl. No.: 13/480,267

(22) Filed: May 24, 2012

(65) Prior Publication Data

US 2013/0039036 A1  Feb. 14, 2013

(30) Foreign Application Priority Data

Aug. 11, 2011  (KR) .................... 10-2011-0079923

(51) Int. Cl.
*F21V 8/00* (2006.01)
*G02F 1/1335* (2006.01)

(52) U.S. Cl.
CPC ............ *G02F 1/1336* (2013.01); *G02B 6/0055* (2013.01); *G02B 6/0076* (2013.01); *G02B 6/0028* (2013.01); *G02B 6/0031* (2013.01)
USPC ........... 362/616; 362/268; 362/608; 362/97.1

(58) Field of Classification Search
CPC .......... G02F 1/13302; G02F 1/133603; G02F 1/133604; G02F 1/133608; G02B 6/42; G02B 6/43; G02B 6/0068; G02B 6/0076
USPC ............... 362/97.1, 97.2, 97.3, 616, 268, 608
See application file for complete search history.

(56) References Cited

U.S. PATENT DOCUMENTS

| 5,438,484 | A  | * | 8/1995  | Kanda et al. ............... 362/613 |
| 7,086,773 | B2 | * | 8/2006  | Kim et al. .................. 362/621 |
| 7,154,570 | B2 | * | 12/2006 | Lee ............................ 349/58 |
| 7,277,079 | B2 | * | 10/2007 | Kobayashi et al. ........... 345/102 |
| 7,597,469 | B2 | * | 10/2009 | Nishigaki ..................... 362/616 |
| 7,632,002 | B1 | * | 12/2009 | Park et al. .................... 362/616 |
| 7,810,977 | B2 | * | 10/2010 | Ueyama ....................... 362/610 |
| 7,918,600 | B2 | * | 4/2011  | Nagata et al. ................. 362/616 |

(Continued)

FOREIGN PATENT DOCUMENTS

| EP | 1847767 A1 | 10/2007 |
| EP | 2081079 A2 | 7/2009 |

(Continued)

OTHER PUBLICATIONS

EP Search Report corresponding to EP Application No. 12169164, dated Sep. 17, 2012, 8 pages.

*Primary Examiner* — Peggy Neils
(74) *Attorney, Agent, or Firm* — Innovation Counsel LLP

(57) ABSTRACT

A backlight assembly that is adapted for use with an image displaying flat panel includes a light guide plate assembly and one or more light sources disposed under the light guide plate assembly. An upper portion of the light guide plate assembly is overlapped by a display area of the flat panel while a lower portion is disposed under the upper portion, and includes light guiding material for redirecting sourced light as well as reflectors for also redirecting light sourced from small, light sourcing areas underneath the upper portion for redistribution into the larger area of light guiding material provided in the upper portion of the light guide plate assembly. The upper portion also has one or more light reflectors. In one embodiment, opposed ones of light sources are angled so they don't shine light directly into one another.

55 Claims, 9 Drawing Sheets

(56) References Cited

U.S. PATENT DOCUMENTS

| | | | |
|---|---|---|---|
| 8,556,492 B2 * | 10/2013 | Joung et al. | 362/616 |
| 2004/0174694 A1 * | 9/2004 | Huang et al. | 362/31 |
| 2009/0059566 A1 | 3/2009 | Kofidis et al. | |
| 2009/0116261 A1 * | 5/2009 | Chen et al. | 362/609 |
| 2009/0316431 A1 * | 12/2009 | Nagata et al. | 362/609 |
| 2010/0271806 A1 | 10/2010 | Bae et al. | |
| 2011/0001901 A1 * | 1/2011 | Solomon et al. | 349/65 |

FOREIGN PATENT DOCUMENTS

| | | |
|---|---|---|
| JP | 9304623 A | 11/1997 |
| JP | 2007-048465 A | 2/2007 |
| KR | 1020080002652 A | 1/2008 |
| KR | 1020100024324 A | 3/2010 |

* cited by examiner

BACKLIGHT ASSEMBLY AND DISPLAY APPARATUS HAVING THE SAME

PRIORITY STATEMENT

This application claims priority under 35 U.S.C. §119 to Korean Patent Application No. 2011-0079923, filed on Aug. 11, 2011 in the Korean Intellectual Property Office (KIPO), the contents of which application are herein incorporated by reference in its entirety.

BACKGROUND

1. Field of Disclosure

The present disclosure of invention relates to a backlight assembly and a display apparatus having the backlight assembly. More particularly, example embodiments in accordance with the present disclosure of invention relate to a centered-source type backlight assembly and a display apparatus having the backlight assembly.

2. Description of Related Technology

Generally, a display apparatus may include a display panel including a display area configured for displaying an image and a peripheral area in which a driving part configured for driving elements in the display area is disposed. The display apparatus may further include a backlight assembly configured for providing light to the display panel and a receiving container receiving the backlight assembly.

The backlight assembly may be classified into a direct-illumination type or an edge-illumination type according to a position, size and usage of the light source.

The backlight assembly for a conventional direct-illumination type typically includes a plurality of light sources distributed across a whole surface of the display panel, so that a manufacturing cost and a thickness of a display apparatus may increase as a result of this conventional configuration which calls for many light sources to be uniformly distributes under an entire display area (DA) of a display panel. More light sources and electrical interconnect to them is called for as the size of the display area (DA) grows.

By contrast, the backlight assembly for the edge-illumination type typically includes a plurality of light sources distributed across only one or more edge portions of the display panel, so that the manufacturing cost and a thickness of a display apparatus may decrease because a smaller number of light sources is called for and a smaller amount of electrical interconnect is needed. Thus, the backlight assembly for the edge-illumination type has been more used (more popular) due to its cost and device thickness advantages.

More specifically, the backlight assembly for the edge-illumination type typically includes a light source and a light guide plate configured for guiding the edge-received light emitted from the edge-disposed lights source to a planar major surface of the corresponding display panel. In other words, the edge-type light source is disposed in a peripheral area of the display panel to be hidden for example by a bezel surrounding the display area. Thus, the display apparatus of the edge-illumination type backlight assembly is typically forced to have a peripheral bezel having a width at least the same as or more than a width of the edge-disposed light sources.

Recently, a centered-source type of backlight assembly has been developed. The centered-type backlight assembly includes a light source disposed under a plurality (e.g., a stack) of light guide plates packed adjacent to each other. The stack of light guide plates guide and re-direct the center-sourced light of the centered-type backlight assembly to be more uniformly distributed to the display panel. In the centered-type backlight assembly, the light source is disposed under the display area, so that the width of the peripheral bezel may be substantially decreased if desired.

However, in the centered-type backlight assembly, a brightness difference may occur between the display area corresponding to where the light source is disposed and the display area corresponding to peripheral areas of the light guide plates where the light source is not disposed. A display sub-area corresponding to where the light source is disposed may be about 10 times brighter than a display sub-area corresponding to the periphery of the topmost light guide plate in the stack. The brightness difference is hard to be blocked. In addition, in the centered-type backlight assembly, a cost increases in order to prevent a hot spot from being generated in a portion corresponding to an incident surface of the light guide plate, and uniformity of the brightness decreases due to light loss between the light guide plates adjacent to each other. In addition, if the light guide plates are separately formed and spaced apart from each other, the light guide plates may be misaligned relative to one another.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

Example embodiments in accordance with the present disclosure of invention provide a centered-type backlight assembly capable of minimizing light loss and capable of uniformly maintaining brightness across the display area.

Example embodiments in accordance with the present disclosure of invention also provide a display apparatus having the above-mentioned backlight assembly.

According to an example embodiment, a backlight assembly includes a light guide plate assembly (e.g., stack) and one or more light sources. The light guide plate assembly includes a first light guide part having a first side surface and a second side surface spaced apart from the first side surface in a first direction and a second light guide part disposed under the first light guide part between the first side surface and the second side surface. The light source is disposed under the first light guide part and laterally adjacent to the second light guide part.

In an example embodiment, the second light guide part may include a third side surface substantially parallel to the first side surface, and a fourth side surface spaced apart from the third side surface in the first direction.

In an example embodiment, the second light guide part may be disposed under the first light guide part and the third and fourth side surfaces of the second light guide part may be between the first side surface and the second side surface.

In an example embodiment, the second light guide part may be adjacent to a central area of the first light guide part.

In an example embodiment, the second light guide part may have a stripe shape extended in a second direction that is substantially perpendicular to the first direction.

In an example embodiment, the light source may be arranged substantially parallel with the third side surface. The backlight assembly may further include a reflecting member under at least one of the first and second light guide parts. The reflecting member may further include a first reflecting member disposed under the first light guide part and a second reflecting member disposed under the second light guide part.

A first edge of the first reflecting member may be disposed within the groove. The backlight assembly may further include a light leakage masking/controlling pattern disposed between the first reflecting member and the second light guide part. The backlight assembly may further include a heat dissipation member having a receiving space receiving the light source. The light guide plate assembly may have a cross sectional 'T'-shape.

In an example embodiment, the light source may form an acute angle with the third side surface. The backlight assembly may further include a reflecting member under at least one of the first and second light guide parts. The reflecting member may further include a first reflecting member disposed under the first light guide part, and a second reflecting member disposed under the second light guide part. A first edge of the first reflecting member may be disposed within the groove. The backlight assembly may further include a light leakage masking/controlling pattern disposed between the first reflecting member and the second light guide part. The backlight assembly may further include a heat dissipation member having a receiving space receiving the light source. The light guide plate assembly may have a cross sectional 'T'-shape.

In an example embodiment, the light source may form an obtuse angle with the third side surface. The backlight assembly may further include a reflecting member under at least one of the first and second light guide parts. The reflecting member may further include a first reflecting member disposed under the first light guide part, and a second reflecting member disposed under the second light guide part. A first edge of the first reflecting member may be disposed within the groove. The backlight assembly may further include a light leakage masking/controlling pattern disposed between the first reflecting member and the second light guide part. The backlight assembly may further include a heat dissipation member having a receiving space receiving the light source. The light guide plate assembly may have a cross sectional 'T'-shape.

In an example embodiment, the light source may be arranged substantially perpendicular to the third side surface. The backlight assembly may further include a reflecting member under at least one of the first and second light guide parts. The reflecting member may further include a first reflecting member disposed under the first light guide part, and a second reflecting member disposed under the second light guide part. A first edge of the first reflecting member may be disposed within the groove. The backlight assembly may further include a light leakage masking/controlling pattern disposed between the first reflecting member and the second light guide part. The backlight assembly may further include a heat dissipation member having a receiving space receiving the light source. The light guide plate assembly may have a cross sectional 'T'-shape.

In an example embodiment, a lower surface of the second light guide part may have first and second inclined surfaces forming a V-shaped cross-section. An interface between the first and second inclined surfaces may form a sharp edge or a rounded edge. The backlight assembly may further include a reflecting member under at least one of the first and second light guide parts. The reflecting member may further include a first reflecting member disposed under the first light guide part, and a second reflecting member disposed under the second light guide part. A first edge of the first reflecting member may be disposed within the groove. The second reflecting member may include a first reflecting portion corresponding to the first inclined surface and a second reflecting portion corresponding to the second inclined surface. The backlight assembly may further include a light leakage masking/controlling pattern disposed between the first reflecting member and the second light guide part. The backlight assembly may further include a heat dissipation member having a receiving space receiving the light source. The heat dissipation member may include side surfaces and a bottom surface, and the bottom surface of the heat dissipation member including a first bottom portion corresponding to the first inclined surface and a second bottom portion corresponding to the second inclined surface. The light guide plate assembly has a cross sectional 'T'-shape.

In an example embodiment, the first light guide part may be integrally formed with the second light guide part.

In an example embodiment, the second light guide part may be disposed under the first light guide part and adjacent to a central area between the first side surface and the second side surface.

In an example embodiment, the light guide plate assembly further may include a connecting portion optically connecting the spaced apart first and second light guide parts.

In an example embodiment, the first light guide part may have a first width along the first direction, the second light guide part may have a second width smaller than the first width along the first direction. The connecting portion may have a third width smaller than the second width along the first direction. The first and second light guide parts and the connecting portion may form a groove into which a reflective layer fits.

In an example embodiment, the backlight assembly may further include a light leakage masking/controlling pattern disposed between the first reflecting member and the second light guide part to prevent or control the formation of backlighting hot spots.

In an example embodiment, the connecting portion may be composed of an adhesive material having a substantially same refractive index as those of the first and second light guide parts.

According to an example embodiment, a display apparatus includes a backlight assembly and a display panel. The backlight assembly generates light. The backlight assembly includes a light guide plate assembly and a light source. The light guide plate assembly includes a first light guide part having a first side surface and a second side surface spaced apart from the first side surface in a first direction and a second light guide part disposed under the first light guide part between the first side surface and the second side surface. The light source is disposed under the first light guide part and laterally adjacent to the second light guide part. The display panel is disposed on the backlight assembly to display an image using the light.

According to the present teachings, a backlight assembly is provided in which a small-area light source unit is overlapped by the larger display area of an image displaying panel. Since the light source unit is not extended from an edge of the display area, a size of a bezel area surrounding the display area may be decreased.

In addition, the light source unit is disposed under a first reflecting member, so that undesired leakage of light rays and formation of brightness hot spots may be prevented.

In addition, a shape of a second light guide part of a light guide plate is changed, so that light may be efficiently guided to a first light guide part of the light guide plate with reduced loss of light energy.

Thus, formation of a bright line or a dark line shown on a display apparatus may be prevented from being substantially generated while efficiency is increased.

BRIEF DESCRIPTION OF THE DRAWINGS

The above and other features and advantages of the present teachings will become more apparent by describing in detailed example embodiments thereof with reference to the accompanying drawings, in which.

DETAILED DESCRIPTION

Hereinafter, the present disclosure of invention will be provided in detail with reference to the accompanying drawings.

Figure 1:
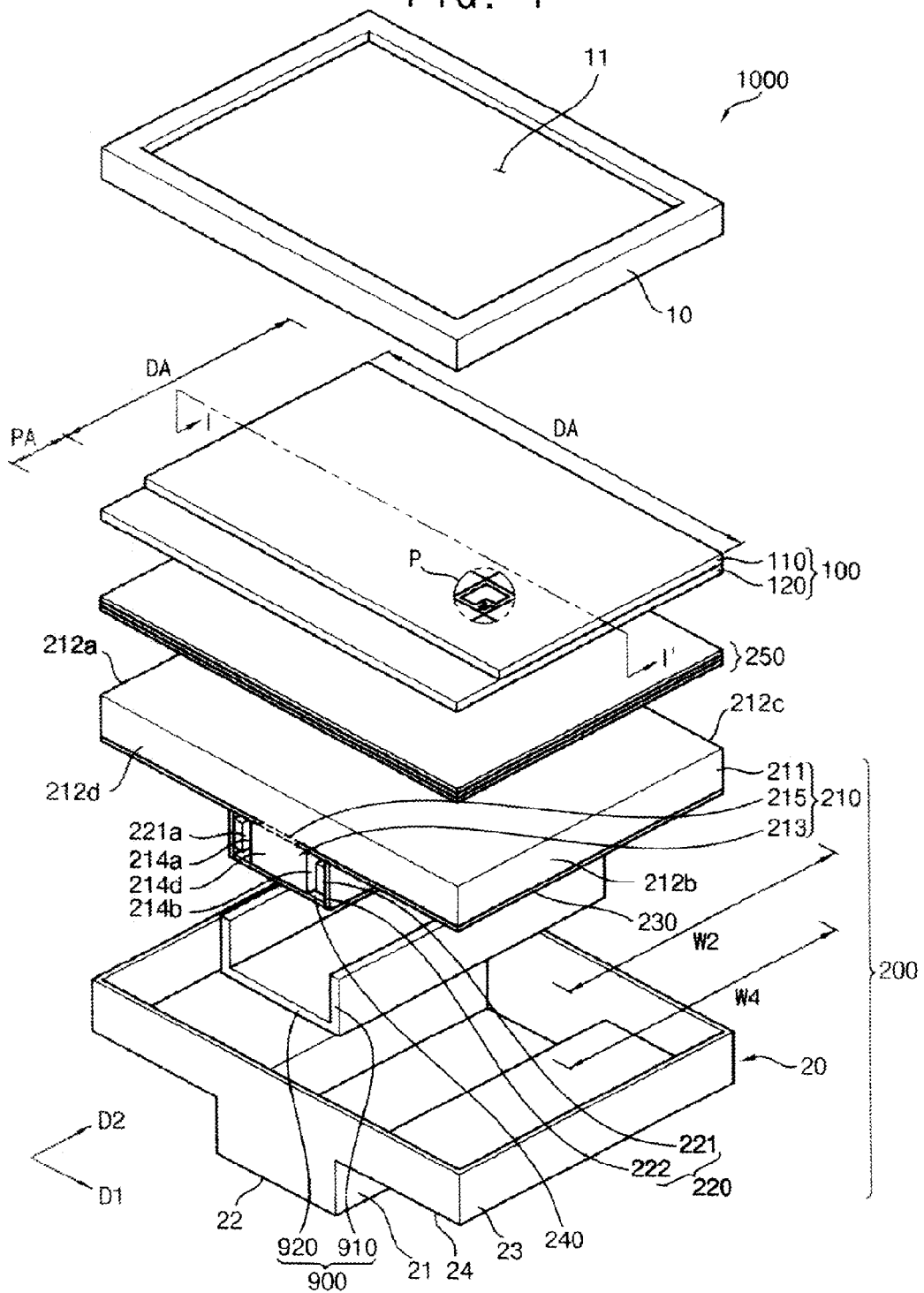
FIG. 1 is an exploded perspective view illustrating a display apparatus according to an example embodiment of the present disclosure.
Figure 2:
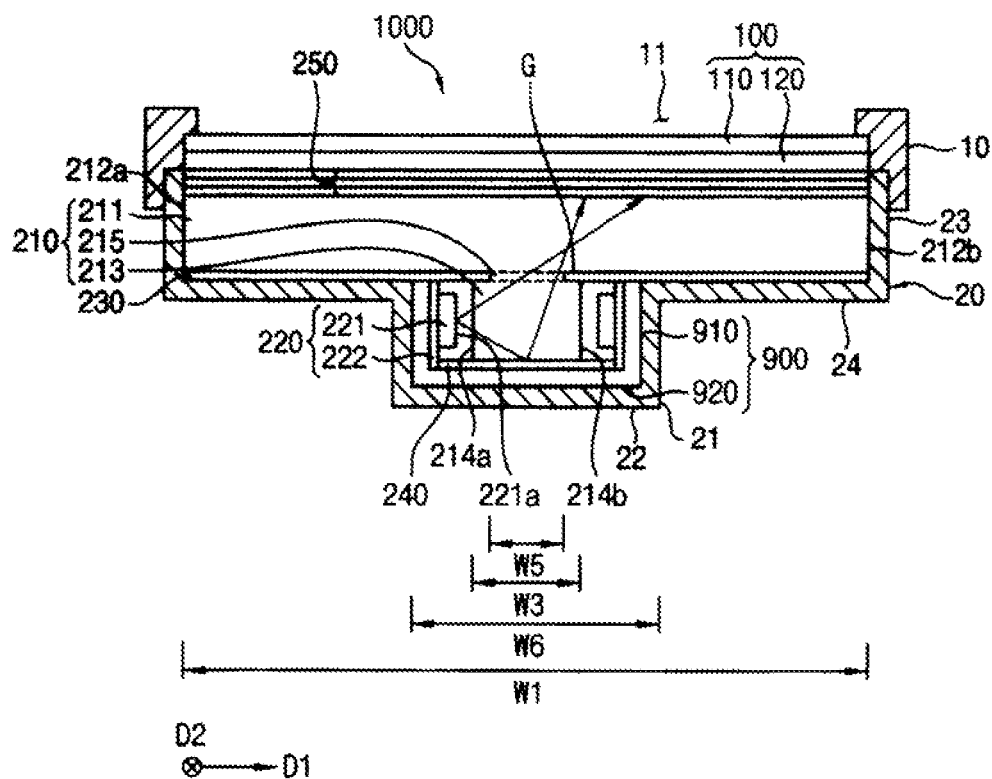
FIG. 2 is a cross-sectional view illustrating the display apparatus along a line I-I' of FIG. 1.

FIG. 1 is an exploded perspective view illustrating a display apparatus according to an example embodiment in accordance with the present disclosure of invention. FIG. 2 is a cross-sectional view illustrating a display apparatus along a line I-I' of FIG. 1.

Referring to FIG. 1 and FIG. 2, a display apparatus 1000 according to the present example embodiment includes a display panel 100, a backlight assembly 200 and a receiving container.

The display panel 100 includes a first display substrate 110, a second display substrate 120 disposed opposite to and spaced apart from the first substrate 110 and a liquid crystal layer (not shown) disposed between the first display substrate 110 and the second display substrate 120. The display panel 100 includes a display area DA configured for displaying an image and a peripheral area PA in which a driving part is provided and configured for driving switching elements in the display area DA. The display area DA may be an area in which the first display substrate 110 overlaps with the second display substrate 120.

A plurality of pixel areas P each including a respective portion of a gate line, a respective portion of a data line crossing with the gate line, a switching element connected to the gate line and the data line portions and a pixel electrode connected to the switching element is formed in the display area DA. A data driving part configured for providing driving signals to respective ones of the data lines is mounted in the peripheral area PA. Alternatively, a gate driving part configured for providing driving signals to respective ones of the gate lines may be further mounted in the peripheral area PA.

The backlight assembly 200 is disposed under the display panel 100, and provides light to the display panel 100. The backlight assembly 200 includes a light guide plate assembly 210, a light source unit 220, a first reflecting member 230, a second reflecting member 240, an optical member 250 and a heat dissipation member 920.

The light guide plate assembly 210 includes a first light guide part 211, a second light guide part 213 and a connecting portion 215 connecting the first and second light guide parts 211 and 213.

The first light guide part 211 is disposed under the display panel 100, and overlaps with the display area DA. The first light guide part 211 has a rectangular prism shape having a first width W1 along the first direction D1 and a second width W2 along the second direction D2 crossing the first direction D1 in a top plan view. The thickness of the prismatic first light guide part 211 is not explicitly denoted, but is understood to be measured along a third axis or direction D3 which is orthogonal to both of the first and second axes, D1 and D2.

The thickness of the prismatic first light guide part 211 causes the latter to have a first side surface 212a, a second side surface 212b opposite to the first side surface 212a, a third side surface 212c connecting the first and second side surfaces 212a, 212b, and a fourth side surface 212d opposite to the third side surface 212c. The first side surface 212a is spaced apart from the second side surface 212b by the first width W1 in the first direction D1. The third side surface 212c is spaced apart from the fourth side surface 212d by the second width W2 smaller than the first width W1 in the second direction D2.

The light guide plate assembly 210 further includes the above-mentioned second light guide part 213 which is smaller than and is disposed under the first light guide part 211 adjacent to a central portion between the first side surface 212a and a second side surface 212b of the first light guide part 211. The second light guide part 213 also has rectangular prism shape having a third width W3 along the first direction D1 and a fourth width W4 along the second direction D2 as seen in a top plan view.

The second light guide part 213 may have a respective first side surface 214a substantially parallel to the first side surface 212a of the first light guide part 211, a second side surface 214b spaced opposingly apart from and facing the first side surface 214a, a third side surface 214c connecting the first side surface 214a with the second side surface 214b, and a fourth side surface 214d facing the third side surface 214c. The first side surface 214a of the second light guide part 213 may be spaced apart from the second side surface 214b of the second light guide part 213 by a third width W3 smaller than the first width W1 in the first direction D1. The third side surface 214c may be spaced apart from the fourth side surface 214d by a fourth width W4 that is substantially the same as the second width W2 in the second direction D2. Alternatively, the fourth width W4 may be smaller than the second width W2.

The light guide plate assembly 210 further includes the above-mentioned connecting portion 215 which is operatively extended from the bottom of the first light guide part 211 to the top of the second light guide part 213. For example, in one embodiment, the first light guide part 211, the second light guide part 213 and the connecting portion 215 are monolithically integrally formed with each other. Alternatively, the connecting portion 215 may be monolithically integrally formed with one but not the other of the first and second light guide parts 211 and 213. The connecting portion 215 has a fifth width W5 along the first direction D1 smaller than the third width W3.

Thus, a lower surface of the first light guide part 211, an upper surface of the second light guide part 213 facing the lower surface of the first light guide 211 and a side surface of the connecting portion 215 define a fillable groove, G having substantially a 'C'-shape in the cross sectional view of FIG. 2.

The light guide plate assembly 210 may be seen overall as having a cross sectional 'T'-shape in the cross sectional view of FIG. 2 where the 'T'-shape is formed by the combination of the first light guide part 211, the second light guide part 213 and the connecting portion 215. The light guide plate assembly 210 functions to guide light rays sourced from the light source unit 220 to the display panel 100 via the second light guide part 213, the connecting portion 215 and the first light guide part 211 in said recited order. For example, the light guide plate assembly 210 includes the first and second light guide parts 211 and 213 that are separated. Alternatively, the first light guide plate 211 may be integrally formed with the second light guide plate 213. The light guide plate assembly 210 may be formed through injection molding to form a T-shape.

The light source unit 220 is disposed under a central strip portion of the first light guide part 211 and laterally adjacent to the second light guide part 213. For example, the light source unit 220 is disposed under the first light guide part 211 in an area overlapping with a central strip of the display area DA. Although the light source unit 220 is disposed in the display area DA, the light source unit 220 does not directly provide its sourced light rays to the display panel 100, but instead has its light indirectly coupled to the display panel 100 by way of the second light guide part 213 and then the first light guide part 211 which is disposed over it and coupled thereto by connecting portion 215. Since the original light source 220 is disposed such that it is difficult for its sourced light to leave without passing through the wider and overlying display panel 100, energy-wasting leakage of light around the display area DA is decreased if not altogether prevented.

The light source unit 220 in combination with the light guide plate assembly 210 may uniformly provide essentially all of its sourced light to the display panel 100. In addition, the light source unit 220 lies under rather than laterally adjacent to the display area DA, so that additional bezel area for hiding the light source unit 220 is not needed. Thus, a width of the bezel area of the display apparatus 1000 may be decreased relative to a display apparatus (not shown) which relies on edge lighting.

The light source unit 220 includes at least one light source 221 and a corresponding at least one printed circuit board (PCB) 222.

The light source 221 is mounted on the PCB 222 and electrically connected to the PCB 222. In one embodiment, respective and opposed pairs of light sources 221 and PCB's 222 are disposed adjacent to the first and second side surfaces 214a and 214b respectively of the second light guide part 213 in parallel. A respective emitting surface 221a of the respective light source 221 faces its respective one of the first and second side surfaces 214a and 214b of the second light guide part 213. The light source 221 may include a light emitting diode (LED), a cold cathode fluorescent lamp (CCFL), etc.

The first bottom reflecting member 230 is disposed under the first light guide part 211 in the areas where the connecting portion 215 is not formed (230 fills the groove G), and it thereby substantially covers the bottom surface of the first light guide part 211. The first reflecting member 230 extends to be disposed between the first light guide part 211 and the second light guide part 213 as well as the light source unit 220. Therefore, the only light which enters from the bottom of the first light guide part 211 is the controlled light of the light source unit 220. Stray light is prevented from entering or leaving in the areas where the first reflecting member 230 is provided. Interior edges of the first reflecting member 230 are inserted into the groove G and fixed to the groove G. Thus, only the connecting portion 215 extends through the first reflecting member 230 to couple light into or out from the first light guide part 211. The connecting portion 215 may have a thickness larger than that of the first reflecting member 230. The first reflecting member 230 reflects light upwardly into the interior of the first light guide part 211.

The second reflecting member 240 is disposed under the second light guide part 213 and the light source(s) 211. For example, the second reflecting member 240 extends from the light source unit 220 facing the first side surface 214a of the second light guide part 213 to the light source unit 220 facing the second side surface 214b of the second light guide part 213. Thus, the second reflecting member 240 may have a sixth width W6 larger than the third width W3 in the first direction D1. The second reflecting member 240 reflects light upwardly into the interior of the second light guide part 211.

The first and second reflecting members may include highly reflective metal materials such as silver (Ag) for example.

More specifically, the light provided from the light source 221 may be reflected by the second reflecting member 240 to thereafter be provided to the display panel 100 via the second light guide part 213, the connecting portion 215 and the first light guide part 211, and/or may it be directly provided to the display panel 100 via the second light guide part 213, the connecting portion 215 and the first light guide part 211.

The optical member 250 is disposed between the display panel 100 and the light guide plate 210. The optical member 250 diffuses, concentrates and uniformizes the light guided to the display panel 100 from the light guide plate 210.

In addition, although not shown in the figures, a reflecting member may be further disposed on the first, second, third and fourth side surfaces 212a, 212b, 212c and 212d of the first light guide part 211 and the third and fourth side surfaces 214c and 214d of the second light guide part 213.

The heat dissipation (heat sinking) member 900 includes side surfaces 910 and a bottom surface 920 connecting the side surfaces 910. The side surfaces 910 extend from the bottom surface 920 in a perpendicular direction with respect to the bottom surface 920. In one embodiment, the heat dissipation member 900 includes only side surfaces 910 corresponding to the first and second side surfaces 214a and 214b of the second light guide part 213, and thus the heat dissipation member 900 may be slidingly combined with the light source unit 220, the second light guide part 213 and the second reflecting member 240 in order to cover the light source unit 220, the second light guide part 213 and the second reflecting member 240.

Alternatively, the heat dissipation member 900 includes side surfaces 910 corresponding to the first, second, third and fourth side surfaces 214a, 214b, 214c and 214d of the second light guide part 213, and thus the heat dissipation member 900 may be combined from underneath with the light source unit 220, the second light guide part 213 and the second reflecting member 240 in order to cover the light source unit 220, the second light guide part 213 and the second reflecting member 240.

The heat dissipation member 900 includes a heat conductive metal material, and thus may easily conduct and dissipate away the concentrated heat generated from the light source unit 220.

The receiving container may further include a top chassis 10 and a bottom chassis 20. The top chassis 10 is combined with the bottom chassis 20, and receives the display panel 100 and the backlight assembly 200.

The top chassis 10 includes an opening 11 exposing the display area DA. The bottom chassis 20 includes first side surfaces 21, a first bottom surface 22 connecting the first side surfaces 21 with each other, second side surfaces 23 substantially parallel to the first side surfaces 21, and a second bottom surface 24 connecting the second side surfaces 23 with each other.

The first side surfaces 21 extend from the first bottom surface 22 in a direction substantially perpendicular to the first bottom surface 22 to form a first receiving space. The second light guide part 213 of the light guide plate 210, the light source unit 220 and the second reflecting member 240 are received in the first receiving space.

The second bottom surface 24 extends from the first side surfaces 21 in a direction substantially parallel to the first bottom surface 22. The second bottom surface 24 does not overlap with the first bottom surface 22.

The second side surfaces 23 extend from the second bottom surface 24 in a direction substantially parallel to the first side surfaces 21 to form a second receiving space. The first light guide part 211 (upper portion) of the light guide plate 210, the first reflecting member 230 and the optical member 250 are received in the second receiving space.

According to this first described, example embodiment, the light source unit 220 is disposed under the first light guide part 211, so that the size of the bezel of the display apparatus 1000 may be decreased.

In addition, the light source unit 220 is disposed under the first reflecting member 230, so that a light leakage may be prevented.

Figure 3:
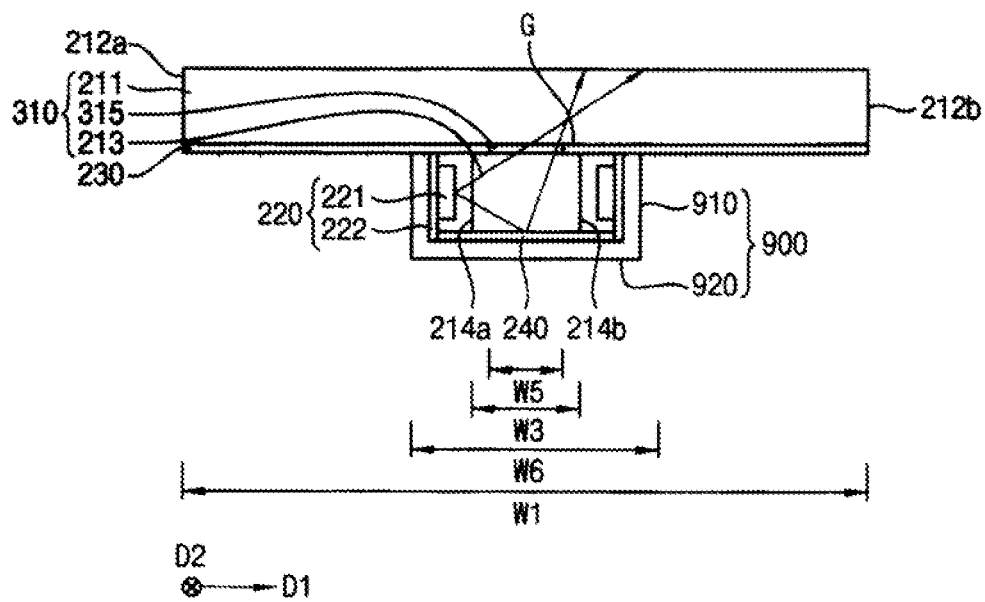
FIG. 3 is a cross-sectional view illustrating a backlight assembly according to another example embodiment.

FIG. 3 is a cross-sectional view illustrating a backlight assembly according to another example embodiment in accordance with the present disclosure of invention.

A backlight assembly according to the present example embodiment is substantially the same as a backlight assembly according to the previous example embodiment of FIG. 1 except for a connecting portion 315. Thus, the same reference numerals will be used to refer to the same or like parts as those described in the previous example embodiment of FIG. 1 and any repetitive explanation concerning the above elements will be omitted.

Referring to FIG. 3, a light guide plate assembly 310 of a backlight assembly according to the present example embodiment includes a first light guide part 211, a second light guide part 213 and a connecting portion 315 different from the connecting portion 215 of the above, first-described embodiment. For example, the light guide plate assembly 310 includes the first and second light guide parts 211 and 213 that are separated. Alternatively, the first light guide plate 211 may be integrally formed with the second light guide plate 213. The light guide plate assembly 310 may be formed through injection molding to form a T-shape.

Here, the connecting portion 315 is a cured optical adhesive material having substantially the same refractive index as those of the first and second light guide part 211 and 213. The connecting portion 315 is disposed between the first light guide part 211 and the second light guide part 213, and adheres the second light guide part 213 to the first light guide part 211. For example, the first light guide part 211 is separately formed from the second light guide part 213, and adheres to the second light guide part 213 by the cured connecting portion 315. The connecting portion 315 may have a fifth width along the first direction D1 smaller than the third width.

The connecting portion 315 may fix the second light guide part 213 to the first light guide part 211.

Thus, the light guide plate 310 may provide the light provided from the light source unit 220 disposed under the first light guide part 211 and adjacent to the second light guide part 213 to the display panel 100.

According to the present example embodiment, the first and second light guide parts 211 and 213 separately formed from each other are adhered to each other by the connecting portion 315, so that the light guide plate 210 may have a "T"-shape without using an injection molding for forming the "T"-shape as a unitary structure.

Figure 4:
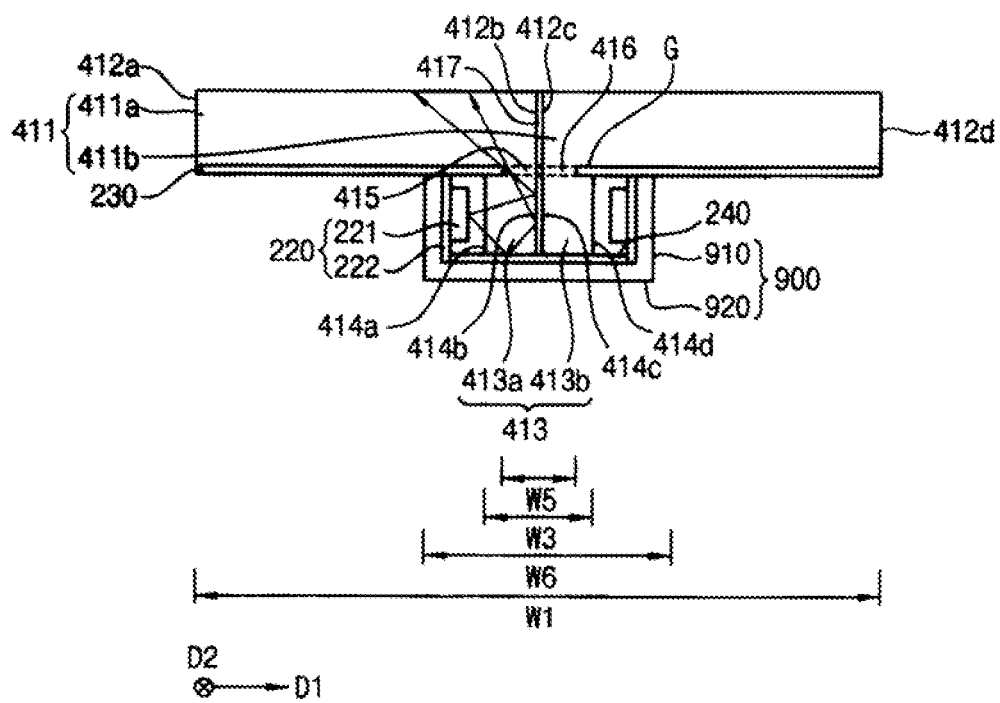
FIG. 4 is a cross-sectional view illustrating a backlight assembly according to still another example embodiment.

FIG. 4 is a cross-sectional view illustrating a backlight assembly according to still another example embodiment.

A backlight assembly according to the present example embodiment is substantially the same as a backlight assembly according to the previous example embodiment of FIG. 1 except for the light guide plates. Thus, the same reference numerals will be used to refer to the same or like parts as those described in the previous example embodiment of FIG. 1 and any repetitive explanation concerning the above elements will be omitted.

Referring to FIG. 4, a light guide plate assembly 410 of a backlight assembly according to the example embodiment includes a first light guide part 411, a second light guide part 413, a first connecting portion 415, a second connecting portion 416 and a third reflecting member 417. For example, the light guide plate assembly 410 includes the first and second light guide parts 411 and 413 that are separated. Alternatively, the first light guide plate 411 may be integrally formed with the second light guide plate 413. The light guide plate assembly 410 may be formed through injection molding to form a T-shape.

The first light guide part 411 is disposed under the display panel 100, and overlaps the display area DA. The first light guide part 411 includes a first sub-light guide part 411a and a second sub-light guide part 411b separately formed from the first sub-light guide part 411a and being mirror symmetric with respect to the first sub-light guide part 411a.

The first sub-light guide part 411a includes a first side surface 412a and a second side surface 412b opposite to the first side surface 412a. The second sub-light guide part 411b includes a third side surface 412c facing the second side surface 412b and a fourth side surface 412d opposite to the third side surface 412d.

The first side surface 412a of the first sub-light guide part 411a may be spaced apart from the fourth side surface 412d of the second sub-light guide part 411b by a first width W1 in a first direction D1.

The second light guide part 413 is disposed under the first light guide part 411, and overlaps with the first sub-light guide part 411a adjacent to the second side surface 412b of the first sub-light guide part 411a and the second sub-light guide part 411b adjacent to the third side surface 412c of the second sub-light guide part 411b. The second light guide part 413 includes a third sub-light guide part 413a disposed under the first sub-light guide part 411a and a fourth sub-light guide part 413b separately formed from the third sub-light guide part 413a, being mirror symmetric to the third sub-light guide part 413a, and disposed under the second sub-light guide part 411b.

The third sub-light guide part 413a includes a first side surface 414a and a second side surface 414b opposite to the first side surface 414a. The fourth sub-light guide part 413b includes a third side surface 414c facing the second side surface 414b and a fourth side surface 414d opposite to the third side surface 414c.

The first side surface 414a of the third sub-light guide part 413a may be spaced apart from the fourth side surface 414d of the fourth sub-light guide part 413b by a third width W3 smaller than the first width W1 in the first direction D1 so as to dispose a light source unit 220 in a display area DA of a display panel 100.

The first connecting portion 415 extends from the first sub-light guide part 411a, and the third sub-light guide part 413a extends from the first connecting portion 415. For example, the first sub-light guide part 411a, the third sub-light guide part 413a and the first connecting portion 415 are integrally formed with each other as a monolithic structure.

The second connecting portion 416 extends from the second sub-light guide part 411b, and the fourth sub-light guide part 413b extends from the second connecting portion 415. For example, the second sub-light guide part 411b, the fourth sub-light guide part 413b and the second connecting portion 416 are integrally formed as a monolithic structure.

Each of the first connecting portion 415 and the second connecting portion 416 has a fifth width W5 in the first direction D1.

Thus, a bottom surface of the first sub-light guide part 411a, a upper surface of the third sub-light guide part 413a facing the bottom surface of the first sub-light guide part 411a and a side surface of the first connecting portion 415 form a first groove G1 of a 'C'-shape. In addition, a bottom surface of the second sub-light guide part 411b, a upper surface of the fourth sub-light guide part 413b facing the bottom surface of the second sub-light guide part 411b and a side surface of the second connecting portion 415 form a second groove G2 of a 'C'-shape.

The third reflecting member 417 is disposed between the first sub-light guide part 411a, the first connecting portion 415 and the third sub-light guide part 413a and the second sub-light guide part 411b, the second connecting portion 416 and the fourth sub-light guide part 413b, which are mirror symmetric to each other.

Optical adhesives having a substantially same refractive index as those of the first and second light guide part 411 and 413 may be disposed between the third reflecting member 417 and each of the first sub-light guide part 411a, the first connecting portion 415 and the third sub-light guide part 413a, and between the third reflecting member 417 and each of the second sub-light guide part 411b, the second connecting portion 416 and the fourth sub-light guide part 413b.

A sum of widths in the first direction D1 of the first and second connecting portions 415 and 416 and a width in the first direction D1 of the third reflecting member 417 is smaller than the second width.

According to the present example embodiment, the third reflecting member 417 is disposed between the first and third sub-light guide parts 411a and 413a where the latter are integrally formed with each other and the second and fourth sub-light guide parts 411b and 413b where the latter are integrally formed with each other, so that the light emitted from the light source 221 to be reflected by the second reflecting member 240 may be symmetrically provided to respective halves of the first light guide part 411 by the third reflecting member 417.

Figure 5:
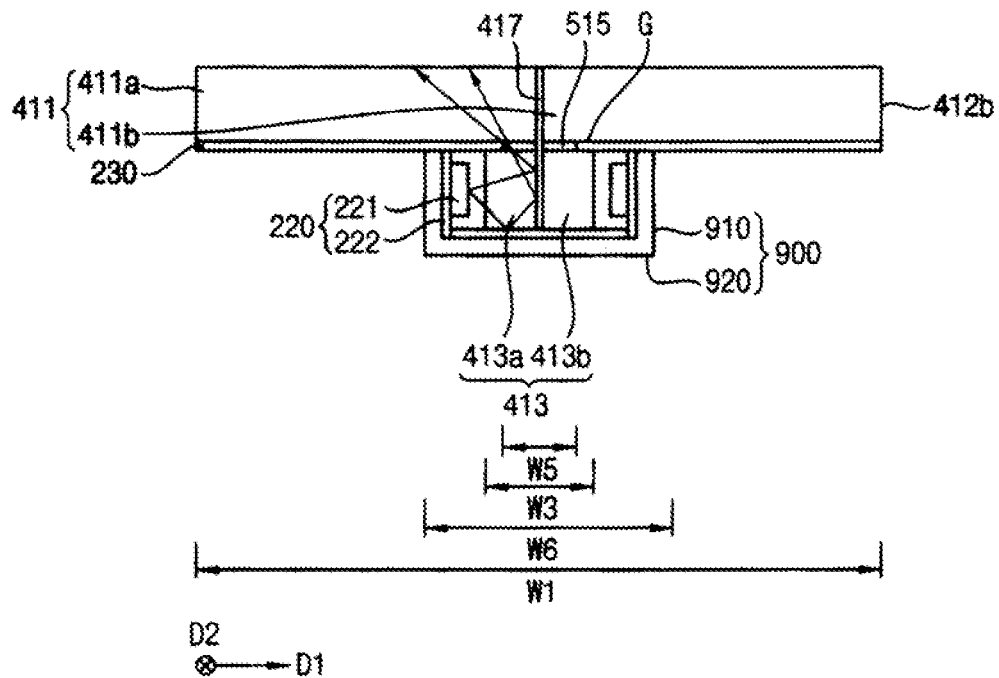
FIG. 5 is a cross-sectional view illustrating a backlight assembly according to still another example embodiment.

FIG. 5 is a cross-sectional view illustrating a backlight assembly according to still another example embodiment.

A backlight assembly according to the present example embodiment of FIG. 5 is substantially the same as a backlight assembly according to the previous example embodiment of FIG. 4 except for the formation of the first and second connecting portions 515. Thus, the same reference numerals will be used to refer to the same or like parts as those described in the previous example embodiment of FIG. 4 and any repetitive explanation concerning the above elements will be omitted.

Referring to FIG. 5, a light guide plate assembly 510 of a backlight assembly according to the present example embodiment includes a first light guide part 411, a second light guide part 413, a connecting portion 515 and a third reflecting member 417. For example, the light guide plate assembly 510 includes the first and second light guide parts 411 and 413 that are separated. Alternatively, the first light guide plate 411 may be integrally formed with the second light guide plate 413. The light guide plate assembly 510 may be formed through injection molding to form a T-shape.

The connecting portion 515 is formed by hardening (curing) an optical adhesive having a substantially same refractive index as those of the first and second light guide parts 411 and 413. The mirror symmetrical connecting portions 515 are disposed between the first sub light guide portion 411a and the third sub light guide portion 413a and between the second sub light guide portion 411b and the fourth sub light guide portion 413b. Thus, the connecting portion 515 adheres the third sub light guide portion 413a to the first sub light guide portion 411a, and adheres the fourth sub light guide portion 413b to the second light guide part 411b.

According to the present example embodiment, the first and third sub-light guide parts 411a and 413a and the second and fourth sub-light guide parts 411b and 411d can be separately formed from each other and thereafter adhered to each other by the connecting portion 515, so that the light guide plate 211 may have a desire shape without using an injection molding for forming the mirror-symmetrical halves of the "T"-shape as a monolithically integrated unitary structure.

Figure 6:
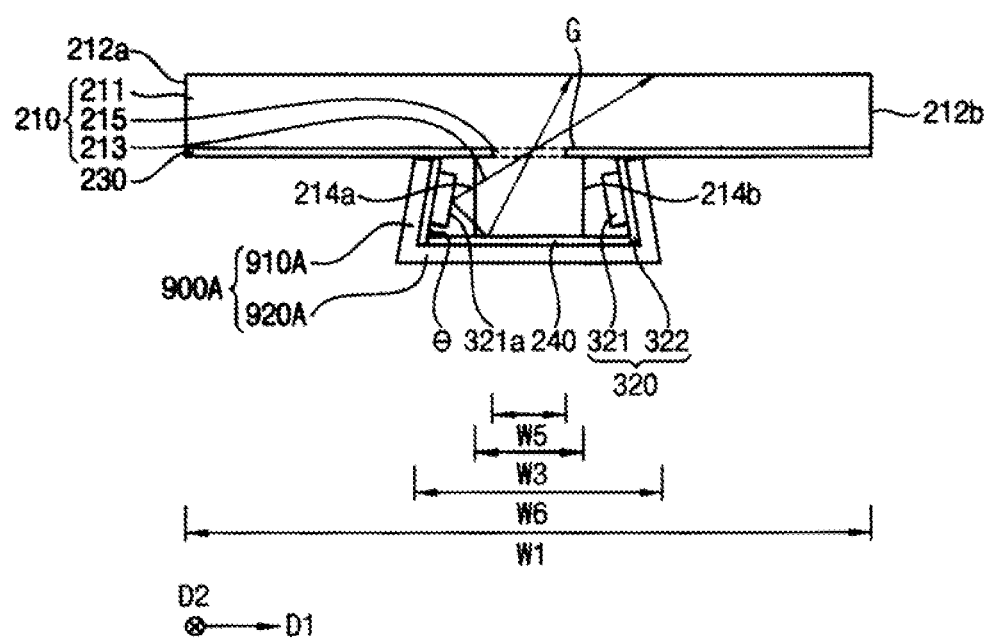
FIG. 6 is a cross-sectional view illustrating a backlight assembly according to still another example embodiment of the present invention.

FIG. 6 is a cross-sectional view illustrating a backlight assembly according to still another example embodiment.

A backlight assembly according to the present example embodiment is substantially the same as a backlight assembly according to the previous example embodiment of FIG. 1 except for a variation of geometry of the light source unit and the receiving container. Thus, the same reference numerals will be used to refer to the same or like parts as those described in the previous example embodiment of FIG. 1 and any repetitive explanation concerning the above elements will be omitted.

Referring to FIG. 6, a light source unit 320 of a backlight assembly according to the present example embodiment is disposed under the first light guide part 211. The light source unit 320 is disposed under the first light guide part 211 overlapping with a central portion of the display area DA, so that the light source unit 320 is overlapped by the larger surface area of the display area DA. The light source unit 320 includes a light source 321 and a printed circuit board PCB 322.

The light source 321 is mounted on the PCB 322 to be electrically connected to the PCB 322. The light source 321 and the PCB 322 have an acute angle θ (less than 90°) with respect to a second reflecting member 240. For example, first ends of the light source 321 and the PCB 322 adjacent to the first light guide part 211 are disposed more adjacent to the second light guide part 213 than second ends of the light source 321 and the PCB 322 far from the first light guide part 211. Thus, a light emitting surface 321a of the light source 321 is not substantially parallel to each of first and second side surfaces 214a and 214b of the second light guide part 213.

The heat dissipation member 900A of the display apparatus of FIG. 6 includes side surfaces 910A and a bottom surface 920A connecting the side surfaces 910A with each other. The side surfaces 910A have an acute angle θ with respect to the bottom surface 920A.

In one embodiment, the heat dissipation member 900A includes only side surfaces 910A corresponding to the first and second side surfaces 214a and 214b of the second light guide part 213, and thus may slidingly combined with the light source unit 320, the second light guide part 213 and the second reflecting member 241 in the second direction D2.

Alternatively, the heat dissipation member 900A may include side surfaces 910A corresponding to the first, second, third and fourth side surfaces 214a, 214b, 214c and 214d of the second light guide part 213, and thus may be combined in sections (not individually shown) with the light source unit 320, the second light guide part 213 and the second reflecting member 240.

The heat dissipation member 900A includes a metal material, and thus may easily dissipate the heat generated from the light source unit 320.

Figure 7:
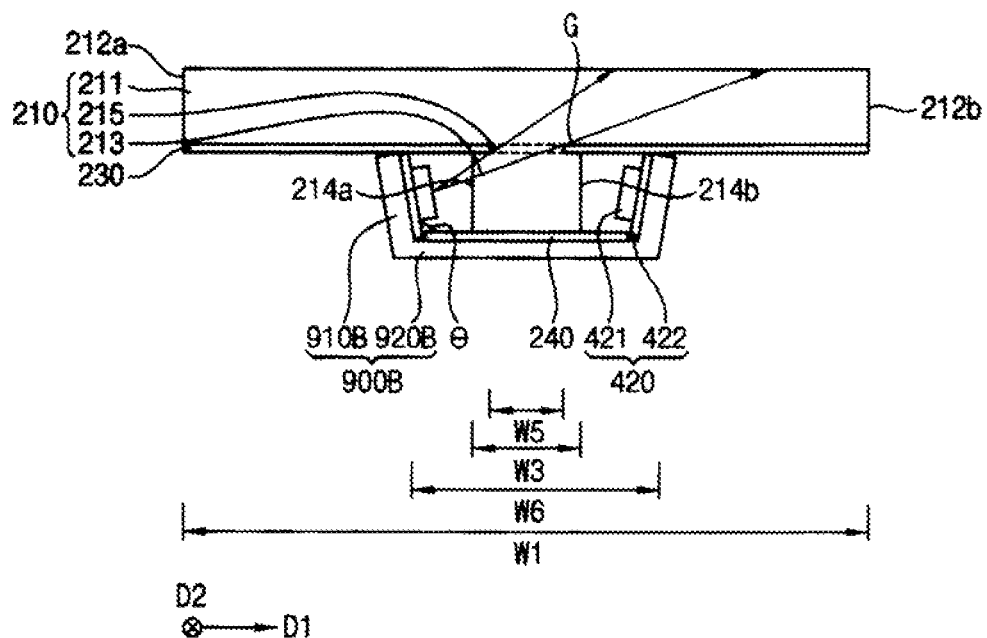
FIG. 7 is a cross-sectional view illustrating a backlight assembly according to still another example embodiment.

In the present example embodiment, the light guide plate is the light guide plate according to the previous example embodiment of FIG. 1, but the light guide plate may be the light guide plate according to the previous example embodiment of FIGS. 3, 5 and 7.

According to the present example embodiment, the light source 321 is inclined with respect to the first and second side surfaces 214a and 214b of the second light guide part 213 by a certain angle θ, so that the light emitted from the light source 321 may be efficiently provided to the first light guide part 211 via the second reflecting member 240 and the second light guide part 213. Thus, the light emitted from the light source 321 is prevented from being provided straight into the opposed other light source facing the light source 321, so that a loss of light may be decreased.

FIG. 7 is a cross-sectional view illustrating a backlight assembly according to still another example embodiment.

A backlight assembly according to the present example embodiment of FIG. 7 is substantially the same as a backlight assembly according to the previous example embodiment of FIG. 1 except for a geometry of the light source unit and receiving container. Thus, the same reference numerals will be used to refer to the same or like parts as those described in the previous example embodiment of FIG. 1 and any repetitive explanation concerning the above elements will be omitted.

Referring to FIG. 7, a light source unit 420 of a backlight assembly according to the present example embodiment is disposed under the first light guide part 211. For example, the light source unit 420 is disposed under the first light guide part 211 overlapping with the display area DA, so that the light source unit 420 is overlapped by the large area of the display area DA. The light source unit 420 includes a light source 421 and a printed circuit board PCB 422.

The light source 421 is mounted on the PCB 422 to be electrically connected to the PCB 422. The light source 421 and the PCB 422 have an obtuse angle θ (greater than 90°) with respect to a second reflecting member 240. For example, first ends of the light source 421 and the PCB 422 adjacent to the first light guide part 211 are disposed more adjacent to the second light guide part 213 than second ends of the light source 421 and the PCB 422 far from the first light guide part 211.

A heat dissipation member 900B of the display apparatus of FIG. 7 includes side surfaces 910B and a bottom surface 920B connecting the side surfaces 910B with each other. The side surfaces 910B have an obtuse angle θ with respect to the bottom surface 920B.

For example, the heat dissipation member 900B includes only side surfaces 900B corresponding to the first and second side surfaces 214a and 214b of the second light guide part 213, and thus may be slidingly combined with the backlight assembly in the second direction D2. Thus, the heat dissipation member 900B may cover the light source unit 420, the second light guide part 213 and the second reflecting member 240.

Alternatively, the heat dissipation member 900B includes side surfaces 910B corresponding to the first, second, third and fourth side surfaces 214a, 214b, 214c and 214d of the second light guide part 213, and thus may be combined with the backlight assembly. Thus, the heat dissipation member 900B may cover the light source unit 420, the second light guide part 213 and the second reflecting member 240.

The heat dissipation member 900B includes a metal material, and thus may easily dissipate heat generated from the light source unit 420.

In the present example embodiment, the light guide plate is the light guide plate according to the previous example embodiment of FIG. 1, but the light guide plate may be the light guide plate according to the previous example embodiment of FIGS. 3, 5 and 7.

According to the present example embodiment, the light source 421 is inclined with respect to the first and second side surfaces 214a and 214b of the second light guide part 213 by a certain angle, so that the light emitted from the light source 421 may be reflected and redirected by the bottom of the first reflecting members 230 as well as by the top of the second reflecting member 240 to be provided to the first light guide part 211 via the second light guide part 213, or may be provided to the first light guide part 211 via the second light guide part 213. Thus, the light emitted from the light source 421 is prevented from providing light straight through to another light source facing the first light source 421, so that a loss of light due to absorption in the facing source may be decreased.

Figure 8:
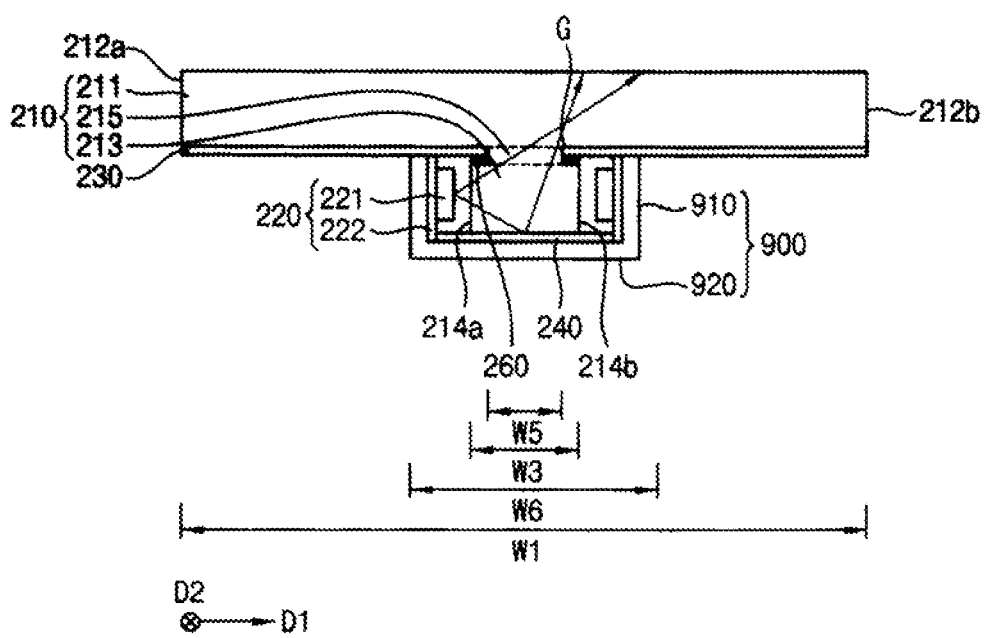
FIG. 8 is a cross-sectional view illustrating a backlight assembly according to still another example embodiment.

FIG. 8 is a cross-sectional view illustrating a backlight assembly according to still another example embodiment.

A backlight assembly according to the present example embodiment is substantially the same as a backlight assembly according to the previous example embodiment of FIG. 1 except for inclusion of a light leakage masking/controlling pattern. Thus, the same reference numerals will be used to refer to the same or like parts as those described in the previous example embodiment of FIG. 1 and any repetitive explanation concerning the above elements will be omitted.

Referring to FIG. 8, a backlight assembly according to the present example embodiment includes a light guide plate 210, a light source unit 220, a first reflecting member 230, a second reflecting member 240, an optical member 250 and a light leakage masking/controlling pattern 260.

In one embodiment, a black printing or a gray printing is performed on the bottom surface of the first reflecting member 230, so that the light leakage masking/controlling pattern 260 is formed on the bottom surface of the first reflecting member 230.

The light leakage masking/controlling pattern 260 is disposed between the first reflecting member 230 and the second light guide part 213. Brightness of the light in the second light guide part 213 adjacent to the light source 221 of the light source unit 220 is larger than the brightness of the light in the second light guide part 213 far from the light source 221, so that undesired pathways of strong light leakage may be generated in the second light guide part 213 adjacent to the light source 221. Thus, the light leakage masking/controlling pattern 260 is disposed over the second light guide part 213 adjacent to the light source 221 to limit of control the light passing through from the second light guide part 213 upward into the first light guide part 211.

In the present example embodiment, the light guide plate is the light guide plate according to the previous example embodiment of FIG. 1, but the light guide plate may be the light guide plate according to the previous example embodiment of FIGS. 3, 5 and 7.

According to the present example, the light leakage masking/controlling pattern 260 is disposed over the second light guide part 213 adjacent to the light source 221, so that the undesired light leakage may be prevented or controlled in the second light guide part 213 adjacent to the light source 221.

Figure 9:
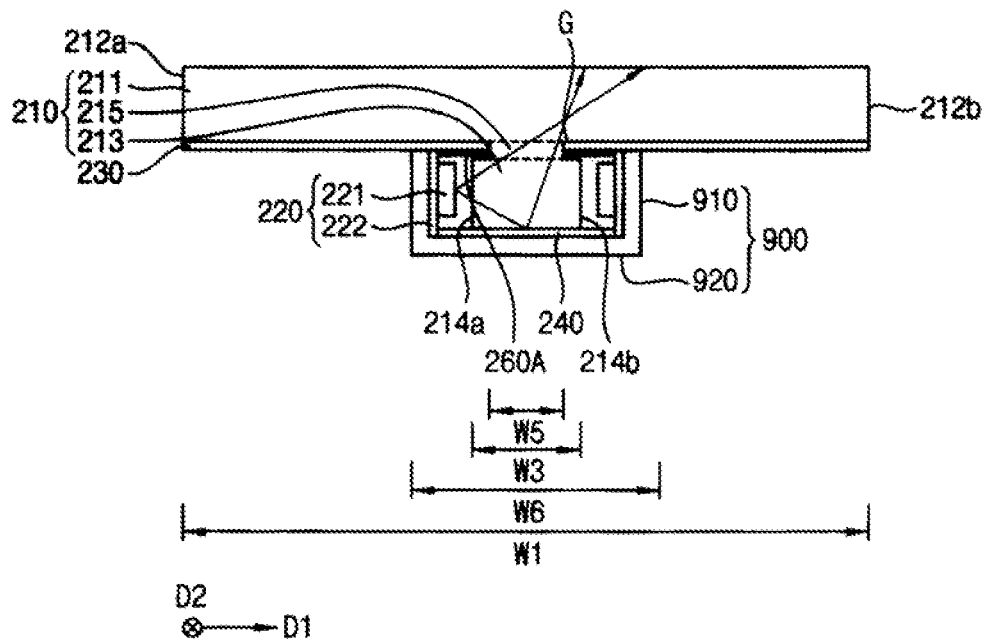
FIG. 9 is a cross-sectional view illustrating a backlight assembly according to still another example embodiment.

FIG. 9 is a cross-sectional view illustrating a backlight assembly according to still another example embodiment.

A backlight assembly according to the present example embodiment is substantially the same as a backlight assembly according to the previous example embodiment of FIG. 1 except for the form of the light leakage masking/controlling pattern 260A. Thus, the same reference numerals will be used to refer to the same or like parts as those described in the previous example embodiment of FIG. 1 and any repetitive explanation concerning the above elements will be omitted.

Referring to FIG. 9, a backlight assembly according to the present example embodiment includes a light guide plate 210, a light source unit 220, a first reflecting member 230, a second reflecting member 240, an optical member 250 and a light leakage masking/controlling pattern 260A.

A black printing or a gray printing is performed on the bottom surface of the first reflecting member 230, so that the light leakage masking/controlling pattern 260A is formed on the bottom surface of the first reflecting member 230.

The light leakage preventing pattern 260A is disposed between the first reflecting member 230 and each of the light source 221 of the light source unit 220 and the second light guide part 213. Brightness of the light in the light source 221 and the second light guide part 213 adjacent to the light source 221 is larger than the brightness of the light in the second light guide part 213 far from the light source 221, so that the light leakage may be generated in the light source 221 and the second light guide part 213 adjacent to the light source 221. Thus, the light leakage masking/controlling pattern 260A is disposed over the light source 221 and the second light guide part 213 adjacent to the light source 221.

In the present example embodiment, the light guide plate is the light guide plate according to the previous example embodiment of FIG. 1, but the light guide plate may be the light guide plate according to the previous example embodiment of FIGS. 3, 5 and 7.

According to the present example, the light leakage masking/controlling pattern 260A is disposed over the light source 221 and the second light guide part 213 adjacent to the light source 221, so that undesired light leakage may be prevented or limited in the areas corresponding to the light source 221 and the second light guide part 213 adjacent to the light source 221.

Figure 10:
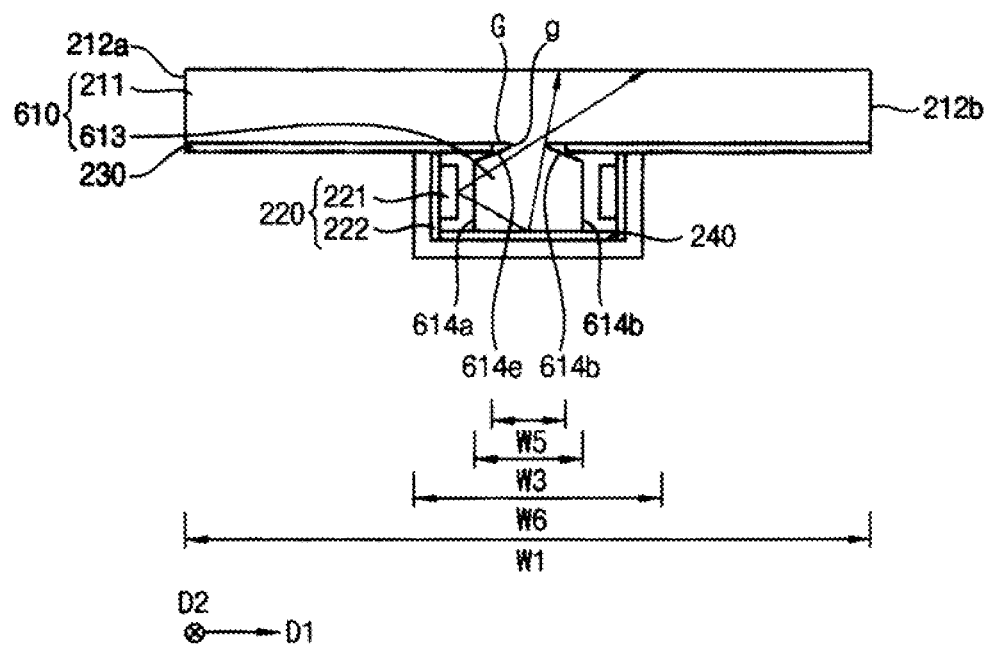
FIG. 10 is a cross-sectional view illustrating a backlight assembly according to still another example embodiment of the present invention.

FIG. 10 is a cross-sectional view illustrating a backlight assembly according to still another example embodiment.

A backlight assembly according to the present example embodiment is substantially the same as a backlight assembly according to the previous example embodiment of FIG. 1 except for the provision of a second light guide part 613 and a corresponding connecting portion. Thus, the same reference numerals will be used to refer to the same or like parts as those described in the previous example embodiment of FIG. 1 and any repetitive explanation concerning the above elements will be omitted.

Referring to FIG. 10, a backlight assembly according to the present example embodiment includes a light guide plate assembly 610, a light source unit 220, a first reflecting member 230, a second reflecting member 240 and an optical member 250.

The light guide plate assembly 610 includes a first light guide part 211 and a second light guide part 613. For example, the light guide plate assembly 610 includes the first and second light guide parts 211 and 613 that are separated. Alternatively, the first light guide plate 211 may be integrally formed with the second light guide plate 613. The light guide plate assembly 610 may be formed through injection molding to form a T-shape.

The second light guide part 613 is disposed under the first light guide part 211 adjacent to a center between a first side surface 212a and a second side surface 212b of the first light guide part 211. The second light guide part 613 has a generally rectangular shape having a third width W3 of a first direction D1 and a fourth width W4 of a second direction D2 on a top plan view.

More specifically, the second light guide part 613 may have a somewhat trapezoidal upper part in its cross section, where the latter includes a first side surface 614a, a second side surface 614b facing the first side surface 614a, a first inclined surface 614e extending from the first side surface 614a and connected to a bottom surface of the first light guide part 211 and a second inclined surface 614f facing the first inclined surface 614e, extending from the second side surface 614b, and connected to the bottom surface of the first light guide part 211. The first inclined surface 614e has an acute angle with respect to the bottom surface of the first light guide part 211 and an obtuse angle with respect to the first side surface 614a of the second light guide part 613. The second inclined surface 615f has an acute angle with respect to the bottom surface of the first light guide part 211 and an obtuse angle with respect to the second side surface 614b of the second light guide part 613. The first side surface 614a of the second light guide part 613 may be spaced apart from the second side surface 614b of the second light guide part 613 in the first direction D1 by the third width W3 smaller than a first width W1 by which a first side surface 212a of the first light guide part 211 is spaced apart from the second side surface 212b of the first light guide part 211 in the first direction D1.

The bottom surface of the first light guide part 211 and the first inclined surface 614e form a groove G having a "V"-shape in a cross-sectional view. A portion at which the bottom surface of the first light guide part 211 meets the first inclined surface 614e may be sharp or rounded.

The first edge of the first reflecting member 230 is inserted into the groove G and fixed to the groove G. The first edge of the first reflecting member 230 is spaced apart from an apex g of the groove G by a certain space.

The display apparatus 4000 may further include a light leakage preventing pattern (not shown) formed on a bottom of the first reflecting member 230, using a black printing or a gray printing.

According to the present example embodiment, the groove G may have a "V"-shape, the light guide plate 610 may be easily formed by using an injection molding.

In addition, according to the present example embodiment, the groove G is formed in a "V"-shape, a length of the apex g of the groove G is smaller than a length of the side surface of the connecting portion 215 of FIG. 1. Thus, the light emitted from the light source 221 may be prevented from being scattered by the apex g.

Figure 11:
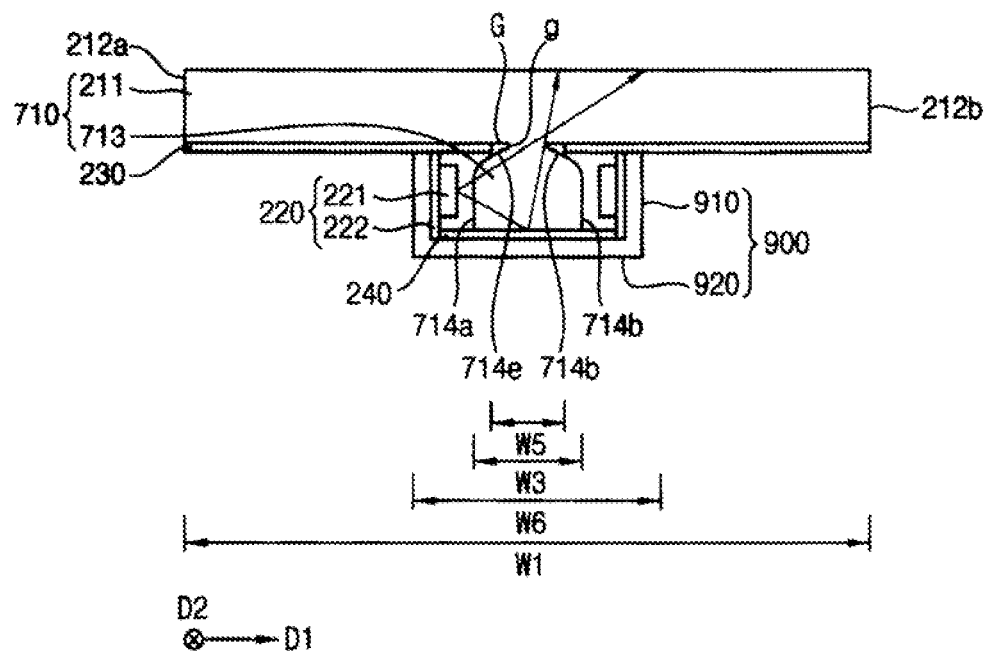
FIG. 11 is a cross-sectional view illustrating a backlight assembly according to still another example embodiment.

FIG. 11 is a cross-sectional view illustrating a backlight assembly according to still another example embodiment.

A backlight assembly according to the present example embodiment is substantially the same as a backlight assembly according to the previous example embodiment of FIG. 1 except for a second light guide part and a connecting portion. Thus, the same reference numerals will be used to refer to the same or like parts as those described in the previous example embodiment of FIG. 1 and any repetitive explanation concerning the above elements will be omitted.

Referring to FIG. 11, a backlight assembly according to the present example embodiment includes a light guide plate 710, a light source unit 220, a first reflecting member 230, a second reflecting member 240 and an optical member 250.

The light guide plate 710 includes a first light guide part 211 and a second light guide part 713. For example, the light guide plate assembly 710 includes the first and second light guide parts 211 and 713 that are separated. Alternatively, the first light guide plate 211 may be integrally formed with the second light guide plate 713. The light guide plate assembly 710 may be formed through injection molding to form a T-shape.

The second light guide part 713 is disposed under the first light guide part 211 adjacent to a center between the first side surface 212a and the second side surface 212b of the first light guide part 211. The second light guide part 713 has a generally rectangular shape having a third width W3 of a first direction D1 and a width W4 of a second direction D2 in a plan view.

The second light guide part 713 may have a curve-wise tapered upper portion in its cross section where the latter includes a first side surface 714a and a second side surface 714b facing the first side surface 714b, a first convex surface 714e extending from the first side surface 714a, connected to a bottom surface of the first light guide part 211, and protruding toward the bottom surface of the first light guide part 211 and a second convex surface 714f facing the first convex surface 714e, extending from the second side surface 714b, connected to the bottom surface of the first light guide part 211, and protruding toward the bottom surface of the first light guide part 211. The first side surface 714a may be spaced apart from the second side surface 714b in the first direction D1 by the third width W3 smaller than a first width W1 by which the first side surface 212a of the first light guide part 211 is spaced apart from the second side surface 212b of the first light guide part 211 in the first direction D1.

A first end of the first convex surface 714e connected to the bottom surface of the first light guide part 211 may be spaced apart from a first end of the second convex surface 714f connected to the bottom surface of the first light guide part 211 in the first direction D1 by a fifth width W5 smaller than the third width W3.

The bottom surface of the first light guide part 211 and the first convex surface 714e form a groove G of a 'V'-shape in a cross-sectional view. A portion at which the bottom surface of the first light guide part 211 meets the first inclined surface 714e may be sharp or round.

A first edge of the first reflecting member 230 is inserted to the groove G to be fixed to the groove G. The first edge of the first reflecting member 230 is spaced apart from the apex g of the groove G by a certain space.

The display apparatus of FIG. 11 may further include a light leakage preventing pattern (not shown) formed on a bottom of the first reflecting member 230, using a black printing or a gray printing.

According to the present example embodiment, the groove G may have a "V"-shape, the light guide plate 610 may be easily formed by using an injection molding.

In addition, according to the present example embodiment, the groove G is formed in a "V"-shape, a length of the apex g of the groove G is smaller than a length of the side surface of the connecting portion 215 of FIG. 1. Thus, the light emitted from the light source 221 may be prevented from being scattered by the apex g.

Figure 12:
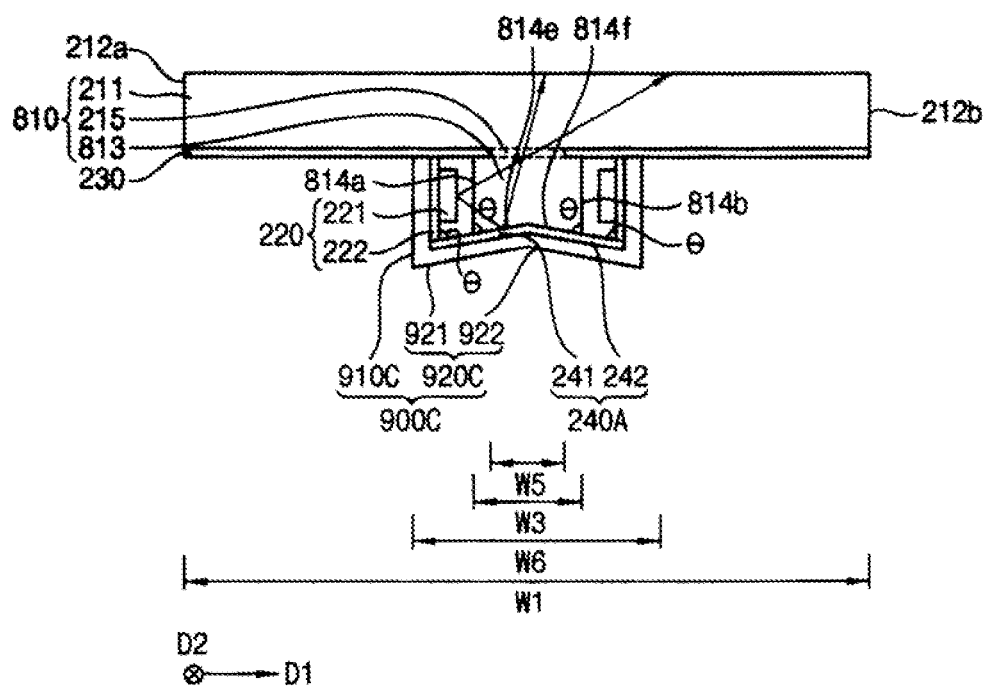
FIG. 12 is a cross-sectional view illustrating a backlight assembly according to still another example embodiment.

FIG. 12 is a cross-sectional view illustrating a backlight assembly according to still another example embodiment.

A backlight assembly according to the present example embodiment is substantially the same as a backlight assembly according to the previous example embodiment of FIG. 1 except for a second light guide part, a second reflecting member and a receiving container. Thus, the same reference numerals will be used to refer to the same or like parts as those described in the previous example embodiment of FIG. 1 and any repetitive explanation concerning the above elements will be omitted.

Referring to FIG. 12, a backlight assembly according to the present example embodiment includes a light guide plate 810, a light source unit 220, a first reflecting member 230, a second reflecting member 240A and an optical member 250.

The light guide plate 810 includes a first light guide part 211, a second light guide part 813 and a connecting portion 215. For example, the light guide plate assembly 810 includes the first and second light guide parts 211 and 813 that are separated. Alternatively, the first light guide plate 211 may be integrally formed with the second light guide plate 813. The light guide plate assembly 810 may be formed through injection molding to form a T-shape.

The second light guide part 813 is disposed under the first light guide part 211 adjacent to a center between a first side surface 212a and a second side surface 212b. The second light guide part 813 has a generally rectangular shape having a third width W3 of a first direction D1 and a fourth width W4 along the second direction D2 in a top plan view.

The second light guide part 813 may include a first side surface 814a, a second side surface 814b facing the first side surface 814a, a first inclined surface 814e extending from a first end of the first side surface 814a far from the first light guide part 211 and having an acute angle θ with respect to the first side surface 814a and a second inclined surface 814f extending from the first inclined surface 814e, connecting the first end of the first side surface 814a far from the first light guide part 211 with a first end of the second side surface 814b far from the first light guide part 811, and having an acute angle θ with respect to the second side surface 814b.

Thus, a bottom surface of the second light guide part 813 is not flat but rather has a 'V'-shape formed by the first and second inclined surfaces 814e and 814f in a cross-sectional view. A portion at which the first inclined surface 814e meets the second inclined surface 814f may be sharp or rounded.

The first side surface 814a may be spaced apart from the second side surface 814b in the first direction D1 by the third width W3 smaller than the first width W1.

The second reflecting member 240A is disposed under the second light guide part 213 and the light source unit 220. The second reflecting member 240A includes a first reflecting portion 241 corresponding to the first inclined surface 814e and a second reflecting portion 242 corresponding to the second inclined surface 814f. The first and second reflecting portions 241 and 242 have acute angles θ with respect to a printed circuit board (PCB) 222 of the light source unit 220 parallel to the first and second side surfaces 814a and 814b of the second light guide part 813. The first reflecting portion 241 extends from the first inclined surface 814e to the light source unit 220 adjacent to the first side surface 814a of the second light guide part 813, and the second reflecting portion 242 extends from the second inclined surface 814f to the light source unit 220 adjacent to the second side surface 814b of the second light guide part 813.

The second reflecting member 240A may have a six width W6 larger than the third width W3. The second reflecting member 240A reflects the light to the second light guide part 811.

The heat dissipation member 900C according to the present example embodiment includes side surfaces 910C and a bottom surface 920C connecting the side surfaces 910C with each other. The side surfaces 910C are parallel to the first and second side surfaces 814a and 814b of the second light guide part 813. The bottom surface 920C includes a first bottom portion 921 corresponding to the first inclined surface 814e and a second bottom portion 922 corresponding to the second inclined surface 814f. The first and second bottom portions 921 and 922 have acute angles θ with respect to the side surface 910C.

In the present example embodiment of FIG. 12, the connecting portion 813 of the light guide plate 810 is the connecting portion of the light guide plate according to the previous example embodiment of FIG. 1, but the connecting portion of the light guide plate may be the connecting portion of the light guide plate according to the previous example embodiment of FIGS. 3, 5 and 7.

According to the present example embodiment, the light emitted from the light source 221 is reflected by the first and second reflecting portions 241 and 242 of the second reflecting member 240A which reflecting portions are inclined with respect to the PCB 222 of the light source unit 220, so that paths of the light may be redirected according to the angle of inclination of the first and second reflecting portions 241 and 242. Thus, the light emitted from the light source 221 may be efficiently provided to the first light guide part 211 via the second light guide part 813.

Figure 13:
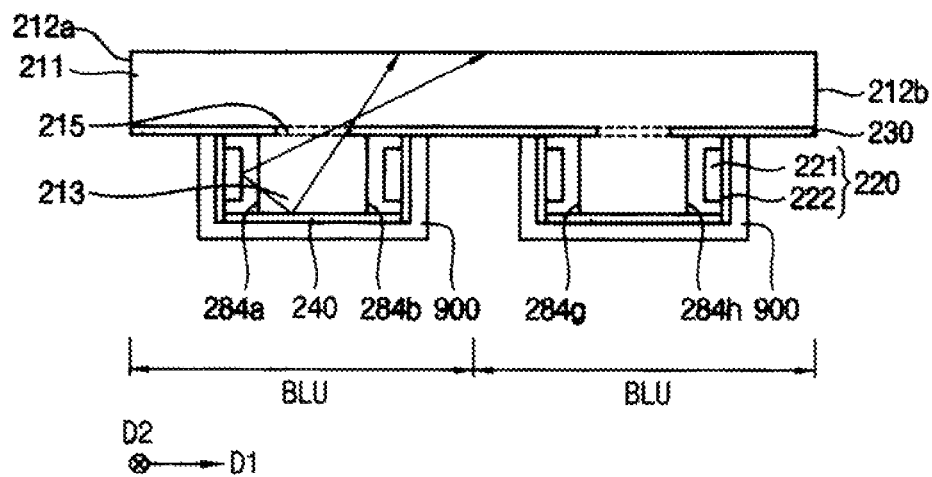
FIG. 13 is a cross-sectional view illustrating a backlight assembly according to still another example embodiment.

FIG. 13 is a cross-sectional view illustrating a backlight assembly according to still another example embodiment of the present teachings.

A backlight assembly according to the present example embodiment is substantially the same in principle as a backlight assembly according to the previous example embodiment of FIG. 1 except for a backlight assembly and a receiving container. Thus, the same reference numerals will be used to refer to the same or like parts as those described in the previous example embodiment of FIG. 1 and any repetitive explanation concerning the above elements will be omitted.

Referring to FIG. 13, a backlight assembly according to the present example embodiment includes a first light guide part 211, a plurality of backlight parts BLU and an optical member 250.

The plurality of backlight parts BLU are disposed under a first light guide part 211 and between the first side surface 212a and a second light guide part 212b. The plurality backlight parts BLU are spaced apart from each other by a certain distance so as to more uniformly maintain brightness across the display apparatus.

One backlight part BLU includes a second light guide part 213, a connecting portion 215, a light source unit 220, a first reflecting member 230, a second reflecting member 240 and a heat dissipation member 900. The second light guide part 213, the connecting portion 215, the light source unit 220, the first reflecting member 230, the second reflecting member 240 and the heat dissipation member 900 of the backlight part BLU are substantially the same as those of the present example embodiment described in the FIG. 1.

In the present example embodiment, the connecting portion of the light guide plate is the connecting portion of the light guide plate according to the previous example embodiment of FIG. 1, but the connecting portion of the light guide plate may be the connecting portion of the light guide plate according to the previous example embodiment of FIGS. 3, 5 and 7.

According to the present example embodiment, the plurality of backlight parts BLU's are used in a large area display apparatus, so that brightness may be more uniformly displayed.

Figure 14:
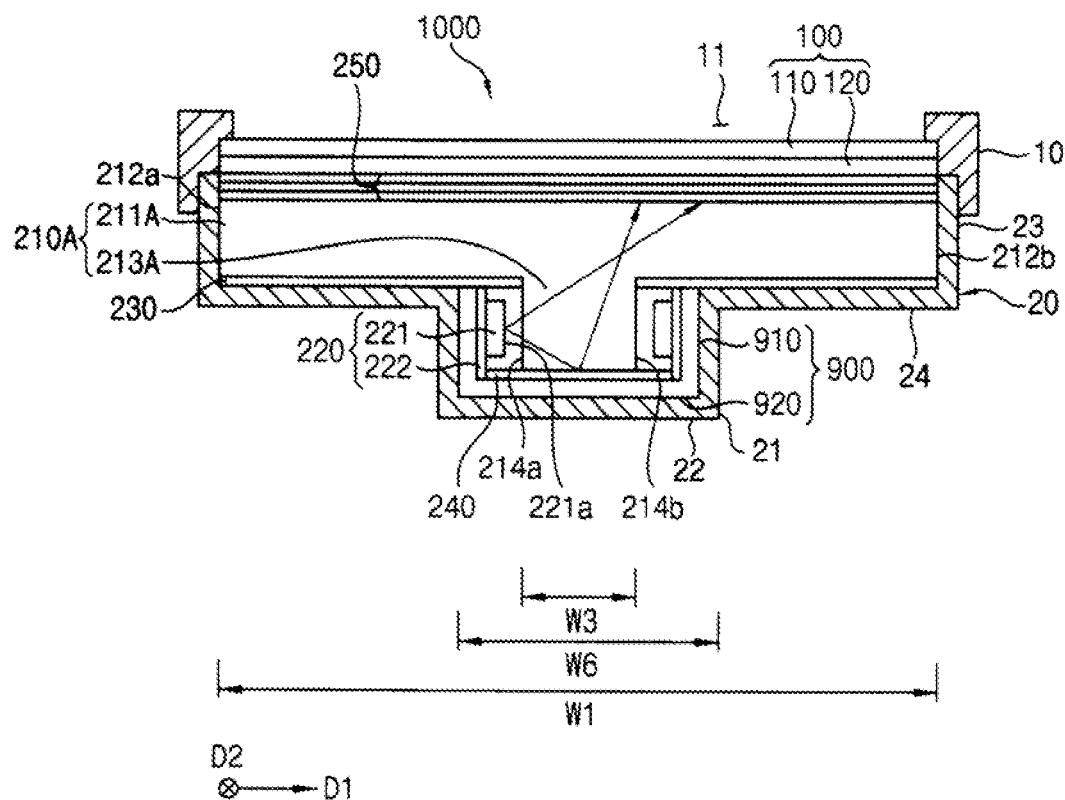
FIG. 14 is a cross-sectional view illustrating a backlight assembly according to still another example embodiment of the present teachings.

FIG. 14 is a cross-sectional view illustrating a backlight assembly according to still another example embodiment of the present teachings.

A backlight assembly according to the present example embodiment is substantially the same in principle as a backlight assembly according to the previous example embodiment of FIG. 1 except for a connecting portion. Thus, the same reference numerals will be used to refer to the same or like parts as those described in the previous example embodiment of FIG. 1 and any repetitive explanation concerning the above elements will be omitted.

Referring to FIG. 14, a light guide plate assembly 210A according to the present example embodiment includes a first light guide part 211A and a second light guide part 213A. The second light guide part 213A extends from the first light guide part 211A to form "T"-shape. For example, the light guide plate assembly 210A includes the first and second light guide parts 211A and 213A that are separated. Alternatively, the first light guide plate 211A may be integrally formed with the second light guide plate 213A. The light guide plate assembly 210A may be formed through injection molding to form a T-shape.

According to the present example embodiment, a light source unit is disposed under the first light guide part 211A, so that the size of the bezel of a display apparatus may be decreased.

According to the present invention, a light source unit overlaps with a display area displaying an image, so that a size of a bezel area surrounding the display area may be decreased.

In addition, the light source unit is disposed under a first reflecting member, so that a light leakage and a backlighting hot spot may be prevented from being generated.

In addition, a shape of a second light guide part of a light guide plate is changed, so that light may be efficiently guided to a first light guide part of the light guide plate.

Thus, a bright line or a dark line shown on a display apparatus may be prevented from being generated.

The foregoing is illustrative of the present disclosure of invention and is not to be construed as limiting thereof. Although a few example embodiments in accordance with the present disclosure of invention have been described, those skilled in the art will readily appreciate from the foregoing that many modifications are possible in the example embodiments without materially departing from the novel teachings and advantages of the present disclosure. Accordingly, all such modifications are intended to be included within the scope of the present teachings. In the claims, means-plus-function clauses are intended to cover the structures described herein as performing the recited function and not only structural equivalents but also functionally equivalent structures. Therefore, it is to be understood that the foregoing is illustrative of the present teachings and is not to be construed as limited to the specific example embodiments disclosed, and that modifications to the disclosed example embodiments, as well as other example embodiments, are intended to be included within the scope of the disclosure.

What is claimed is:

1. A backlight assembly comprising:
   a light guide plate assembly including a first light guide part having a first side surface and a second side surface spaced apart from the first side surface in a first direction and a second light guide part disposed under the first light guide part between the first side surface and the second side surface;
   a light source disposed only under the first light guide part and disposed laterally adjacent to the second light guide part; and
   a heat dissipation member having a receiving space receiving the light source, wherein the heat dissipation member comprises:
      two side surfaces; and
      a bottom surface connecting the side surfaces.

2. The backlight assembly of claim 1, wherein the second light guide part includes a third side surface substantially parallel to the first side surface, and a fourth side surface spaced apart from the third side surface in the first direction.

3. The backlight assembly of claim 2, wherein the second light guide part is disposed under the first light guide part and the third and fourth side surfaces of the second light guide part is between the first side surface and the second side surface.

4. The backlight assembly of claim 3, wherein the second light guide part is adjacent to a central area of the first light guide part.

5. The backlight assembly of claim 4, wherein the second light guide part has an elongated bar shape extending in a second direction that is substantially perpendicular to the first direction.

6. The backlight assembly of claim 2, wherein the light source faces the third side surface of the second light guide part.

7. The backlight assembly of claim 6, further comprising a reflecting member under at least one of the first and second light guide parts.

8. The backlight assembly of claim 7, wherein the reflecting member further comprises:
   a first reflecting member disposed under the first light guide part, a first edge of the first reflecting member being disposed within a groove defined between the first and the second light guide parts; and
   a second reflecting member disposed under the second light guide part.

9. The backlight assembly of claim 8, further comprising a light leakage masking/controlling pattern disposed between the first reflecting member and the second light guide part.

10. The backlight assembly of claim 6, wherein the light guide plate assembly has a cross sectional 'T'-shape.

11. The backlight assembly of claim 2, wherein the light source faces the third side surface, and the light source is tilted toward a lower surface of the second light guide part connecting the third side surface and the fourth side surface.

12. The backlight assembly of claim 11, further comprising a reflecting member under at least one of the first and second light guide parts.

13. The backlight assembly of claim 12, wherein the reflecting member further comprises:
   a first reflecting member disposed under the first light guide part, a first edge of the first reflecting member being disposed within a groove defined between the first and the second light guide parts; and
   a second reflecting member disposed under the second light guide part.

14. The backlight assembly of claim 13, further comprising a light leakage masking/controlling pattern disposed between the first reflecting member and the second light guide part.

15. The backlight assembly of claim 11, wherein the light guide plate assembly has a cross sectional 'T'-shape.

16. The backlight assembly of claim 2, wherein the light source faces the third side surface, and the light source is tilted toward a light emitting surface of the first light guide part.

17. The backlight assembly of claim 16, further comprising a reflecting member under at least one of the first and second light guide parts.

18. The backlight assembly of claim 17, wherein the reflecting member further comprises:
   a first reflecting member disposed under the first light guide part, a first edge of the first reflecting member being disposed within a groove defined between the first and the second light guide parts; and
   a second reflecting member disposed under the second light guide part.

19. The backlight assembly of claim 18, further comprising a light leakage masking/controlling pattern disposed between the first reflecting member and the second light guide part.

20. The backlight assembly of claim 17, wherein the light guide plate assembly has a cross sectional 'T'-shape.

21. The backlight assembly of claim 2, further comprising a reflecting member under at least one of the first and second light guide parts.

22. The backlight assembly of claim 21, wherein the reflecting member further comprises:
   a first reflecting member disposed under the first light guide part, a first edge of the first reflecting member being disposed within a groove defined between the first and the second light guide parts; and
   a second reflecting member disposed under the second light guide part.

23. The backlight assembly of claim 22, further comprising a light leakage masking/controlling pattern disposed between the first reflecting member and the second light guide part.

24. The backlight assembly of claim 2, wherein the light guide plate assembly has a cross sectional 'T'-shape.

25. The backlight assembly of claim 2, wherein a lower surface of the second light guide part has first and second inclined surfaces forming a V-shaped cross-section.

26. The backlight assembly of claim 25, wherein an interface between the first and second inclined surfaces forms a sharp edge or a rounded edge.

27. The backlight assembly of claim 25, further comprising a reflecting member under at least one of the first and second light guide parts.

28. The backlight assembly of claim 27, wherein the reflecting member further comprises:
   a first reflecting member disposed under the first light guide part, a first edge of the first reflecting member being disposed within a groove defined between the first and the second light guide parts; and
   a second reflecting member disposed under the second light guide part.

29. The backlight assembly of claim 28, wherein the second reflecting member comprises a first reflecting portion corresponding to the first inclined surface and a second reflecting portion corresponding to the second inclined surface.

30. The backlight assembly of claim 28, further comprising a light leakage masking/controlling pattern disposed between the first reflecting member and the second light guide part.

31. The backlight assembly of claim 25, wherein the bottom surface of the heat dissipation member includes a first inclined bottom portion corresponding to the first inclined surface and a second inclined bottom portion corresponding to the second inclined surface.

32. The backlight assembly of claim 25, wherein the light guide plate assembly has a cross sectional 'T'-shape.

33. The backlight assembly of claim 1, wherein the first light guide part is integrally formed with the second light guide part.

34. The backlight assembly of claim 1, wherein the light guide plate assembly further includes a connecting portion connecting the first light guide part with the second light guide part.

35. The backlight assembly of claim 34, wherein the first light guide part has a first width along the first direction,
the second light guide part has a second width smaller than the first width along the first direction,
the connecting portion has a third width smaller than the second width along the first direction, and
the first and second light guide parts and the connecting portion are stacked to define a groove between the first and second light guide parts.

36. The backlight assembly of claim 35, further comprising:
a first reflecting member disposed under the first light guide part, a first edge of the first reflecting member being disposed within the groove.

37. The backlight assembly of claim 36, further comprising a light leakage masking/controlling pattern disposed between the first reflecting member and the second light guide part.

38. The backlight assembly of claim 36, further comprising a light leakage masking/controlling pattern disposed between the first reflecting member and each of the second light guide part and the light source,
wherein the light leakage masking/controlling pattern extends from the second light guide part to the light source.

39. The backlight assembly of claim 35, wherein the groove has a "C"-shape formed by a bottom surface of the first light guide part, an upper surface of the second light guide part and a side surface of the connecting portion.

40. The backlight assembly of claim 34, wherein the connecting portion is composed of an adhesive material having a substantially same refractive index as those of the first and second light guide parts.

41. The backlight assembly of claim 1, wherein the second light guide part includes a third side surface substantially parallel to the first side surface, a fourth side surface spaced apart from the third side surface in the first direction, a first connecting surface connecting a bottom surface of the first light guide part with the third side surface, and a second connecting surface spaced apart from the first connecting surface in the first direction and connecting the bottom surface of the first light guide part with the fourth side surface, and
the bottom surface of the first light guide part, and the first and second connecting surfaces of the second light guide part form a groove.

42. The backlight assembly of claim 41, wherein the first connecting surface is a first inclined surface forming an acute angle with respect to the bottom surface of the first light guide part and an obtuse angle with respect to the first side surface of the second light guide part,
the second connecting surface is a second inclined surface forming an acute angle with respect to the bottom surface of the first light guide part and an obtuse angle with respect to the second side surface of the second light guide part, and
the groove has a 'V'-shape formed by the bottom surface of the first light guide part and each of the first and second connecting surfaces of the second light guide part.

43. The backlight assembly of claim 41, wherein the first and second connecting surfaces are first and second curved convex surfaces protruding toward the bottom surface of the first light guide part.

44. The backlight assembly of claim 1, wherein the first light guide part includes a first sub light guide portion and a second sub light guide portion separately formed from the first sub light guide portion, and
the second light guide part includes a third sub light guide portion disposed under the first sub light guide portion and a fourth sub light guide portion disposed under the second sub light guide portion.

45. The backlight assembly of claim 44, wherein the light guide plate comprises:
a first connecting portion connecting the first sub light guide portion with the third sub light guide portion;
a second connecting portion connecting the second sub light guide portion with the fourth sub light guide portion; and
a second reflecting member disposed between the first and third sub light guide portions and the second and fourth sub light guide portions.

46. The backlight assembly of claim 45, wherein the second reflecting member includes a metal that reflects the light.

47. The backlight assembly of claim 46, wherein each of the first and second connecting portions includes an adhesive material having a substantially same refractive index as those of the first and second light guide parts.

48. The backlight assembly of claim 1, wherein the light source faces a side surface of the second light guide part, and the light source is inclined with respect to the side surface of the second light guide part.

49. The backlight assembly of claim 48, further comprising:
a third reflecting member disposed under the second light guide part and the light source, and extending from the second light guide part to the light source; and
a heat dissipation member having a receiving space receiving the second light guide part, the light source and the third reflecting member.

50. The backlight assembly of claim 49, wherein the light source fowls an acute angle with respect to the second reflecting member, and
the heat dissipation member includes a bottom portion substantially parallel to the third reflecting member and a side surface portion extending from the bottom portion and having an acute angle with respect to the bottom portion.

51. The backlight assembly of claim 49, wherein the light source forms an obtuse angle with respect to the third reflecting member, and
the heat dissipation member includes a bottom portion substantially parallel to the third reflecting member and a side surface portion extending from the bottom portion and having an obtuse angle with respect to the bottom portion.

52. The backlight assembly of claim 1, wherein the light guide part includes a third side surface substantially parallel to the first side surface, a fourth side surface spaced apart from the third side surface in the first direction and a bottom surface connecting the third side surface with the fourth side surface, and the bottom surface includes a first inclined surface extending from the third side surface, and a second inclined surface extending from the fourth side surface and connecting the third side surface with the fourth side surface.

53. The backlight assembly of claim 52, wherein the first and second inclined surfaces form acute angles with respect to the third and fourth side surfaces, respectively.

54. The backlight assembly of claim 53, further comprising:

a third reflecting member disposed under the second light guide part and the light source, and including a first reflecting portion corresponding to the first inclined surface and a second reflecting portion extending from the first reflecting portion and corresponding to the second inclined surface; and a heat dissipation member including a first bottom portion corresponding to the first inclined surface, a second bottom portion extending from the first bottom portion and corresponding to the second inclined surface and side surface portions extending from each of the first and second bottom portions, and having a receiving space receiving the light source and the third reflecting member.

55. A display apparatus comprising:

a backlight assembly generating light, the backlight assembly including:

a light guide plate assembly including a first light guide part having a first side surface and a second side surface spaced apart from the first side surface in a first direction and a second light guide part disposed under the first light guide part between the first side surface and the second side surface; and a light source disposed only under the first light guide part and disposed laterally adjacent to the second light guide part; and a heat dissipation member having a receiving space receiving the light source, wherein the heat dissipation member comprises:

two side surfaces; and a bottom surface connecting the side surfaces; and a display panel disposed on the backlight assembly to display an image using the light.

* * * * *